(12) United States Patent
Patil et al.

(10) Patent No.: US 12,365,241 B1
(45) Date of Patent: Jul. 22, 2025

(54) AXIAL SHIFTER ASSEMBLY FOR A TRANSMISSION

(71) Applicant: DEERE & COMPANY, Moline, IL (US)

(72) Inventors: Mahendra S. Patil, Pune (IN); Thomas G. Ore, Cedar Falls, IA (US); Bradley A. Merrill, Dike, IA (US); Roshan Sharma, Jaipur (IN)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 18/752,989

(22) Filed: Jun. 25, 2024

(51) Int. Cl.
*B60K 25/06* (2006.01)
*B60K 17/28* (2006.01)
*F16H 61/28* (2006.01)

(52) U.S. Cl.
CPC .............. *B60K 25/06* (2013.01); *B60K 17/28* (2013.01); *F16H 61/2807* (2013.01)

(58) Field of Classification Search
CPC ...... B60K 25/06; B60K 17/28; F16H 61/2807
See application file for complete search history.

(56) References Cited

U.S. PATENT DOCUMENTS

| | | | |
|---|---|---|---|
| 3,580,371 A | 5/1971 | Kron et al. | |
| 5,658,087 A * | 8/1997 | Butkovich | B60K 17/28 403/328 |
| 8,127,632 B2 | 3/2012 | Buhrke | |
| 8,984,973 B1 | 3/2015 | Brenninger | |
| 9,421,863 B2 * | 8/2016 | Ruokola | B60K 25/02 |
| 10,959,366 B2 | 3/2021 | Lang et al. | |
| 11,498,418 B2 * | 11/2022 | Sanjotra | F16D 25/061 |
| 2015/0251537 A1 * | 9/2015 | Ruokola | F16D 25/061 74/15.4 |

FOREIGN PATENT DOCUMENTS

| | | |
|---|---|---|
| CN | 214425028 U | 10/2021 |
| DE | 102011084622 A1 | 4/2013 |
| DE | 102011084623 A1 | 4/2013 |
| DE | 102019112157 A1 | 11/2020 |
| EP | 2730446 A1 | 5/2014 |
| EP | 3085567 A2 | 10/2016 |
| EP | 2853431 B1 | 11/2018 |
| EP | 3736158 B1 | 1/2022 |
| EP | 4098908 A1 | 12/2022 |
| GB | 1273328 A | 5/1972 |

* cited by examiner

*Primary Examiner* — Faye M Fleming
(74) *Attorney, Agent, or Firm* — Lucian Wayne Beavers; Patterson Intellectual Property Law PC

(57) ABSTRACT

An axial shifter assembly for a transmission. The axial shifter assembly includes a gear and a shifting collar arranged co-axially with each other. The shifting collar has at least one axial tooth projecting axially therefrom and is movable axially between an engaged position in which the at least one axial tooth drivingly engages with the gear and a disengaged position in which the at least one axial tooth is disengaged from the gear. The axial shifter assembly also includes a piston disposed at least partially radially inwards of the shifting collar. The shifting collar moves with the piston. The piston is actuatable between a first axial position corresponding to the disengaged position and a second axial position corresponding to the engaged position.

20 Claims, 5 Drawing Sheets

AXIAL SHIFTER ASSEMBLY FOR A TRANSMISSION

TECHNICAL FIELD

The present disclosure relates generally to an axial shifter assembly for a transmission, such as a work vehicle transmission.

BACKGROUND

A shifter assembly may be used to selectively engage or disengage a gear in a transmission. Shifter assemblies are typically bulky and costly.

SUMMARY

The disclosure provides a compact shifter assembly having a shifting provision inside the shaft. The disclosure also provides a provision for relieving the restoring force of a biasing member in the shifter assembly to improve disassembly and serviceability thereof.

In one aspect, the disclosure provides an axial shifter assembly for a transmission. The axial shifter assembly includes a gear and a shifting collar arranged co-axially with each other. The shifting collar has at least one axial tooth projecting axially therefrom and is movable axially between an engaged position in which the at least one axial tooth drivingly engages with the gear and a disengaged position in which the at least one axial tooth is disengaged from the gear. The axial shifter assembly also includes a piston disposed at least partially radially inwards of the shifting collar. The shifting collar moves with the piston. The piston is actuatable between a first axial position corresponding to the disengaged position and a second axial position corresponding to the engaged position.

In another aspect, the disclosure provides a vehicle including a gearbox having the axial shifter assembly.

In yet another aspect, the disclosure provides an axial shifter assembly. The axial shifter assembly includes a central shaft and a shifting collar movable axially with respect to the central shaft into and out of driving engagement with a co-axial gear. The shifter assembly also includes a piston at least partially disposed radially inwards of the shifting collar. The shifting collar moves axially with the piston. The piston is actuatable between a first axial position and a second axial position. The axial shifter assembly also includes a biasing member at least partially disposed radially inwards of the shifting collar and biasing the piston to one of the first axial position or the second axial position, and a retainer for retaining the biasing member with respect to the central shaft. The retainer is removably fastened with respect to the central shaft.

In yet another aspect, the disclosure provides a method for using an axial shifter assembly having a shifting collar and a co-axial gear arranged about a central shaft. The method includes axially moving the shifting collar into and out of driving engagement with the co-axial gear via a piston at least partially disposed radially inwards of the shifting collar, biasing the piston using a biasing member, and retaining the biasing member using a retainer removably connected with respect to the central shaft.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
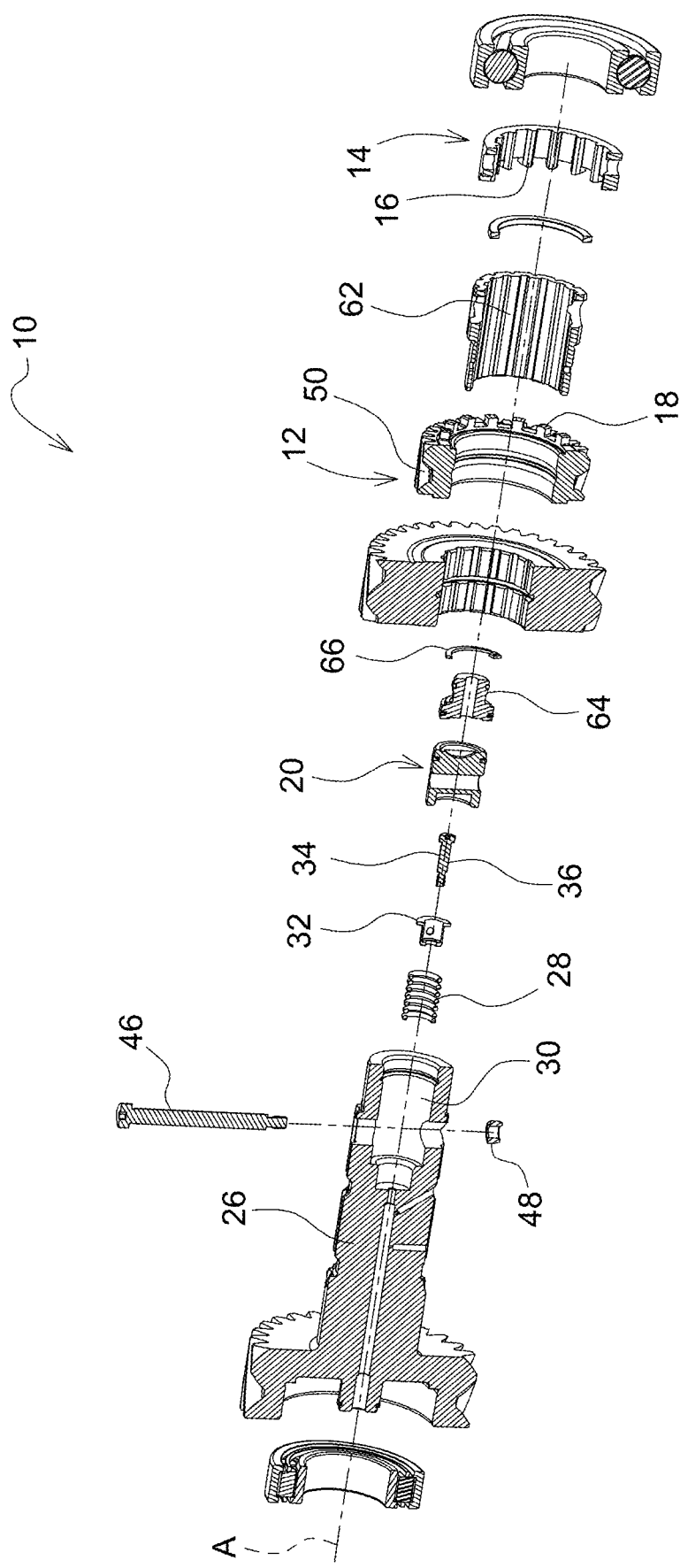
FIG. 1 is an exploded cross-sectional view of an axial shifter assembly in accordance with one implementation of the present disclosure.
Figure 2:
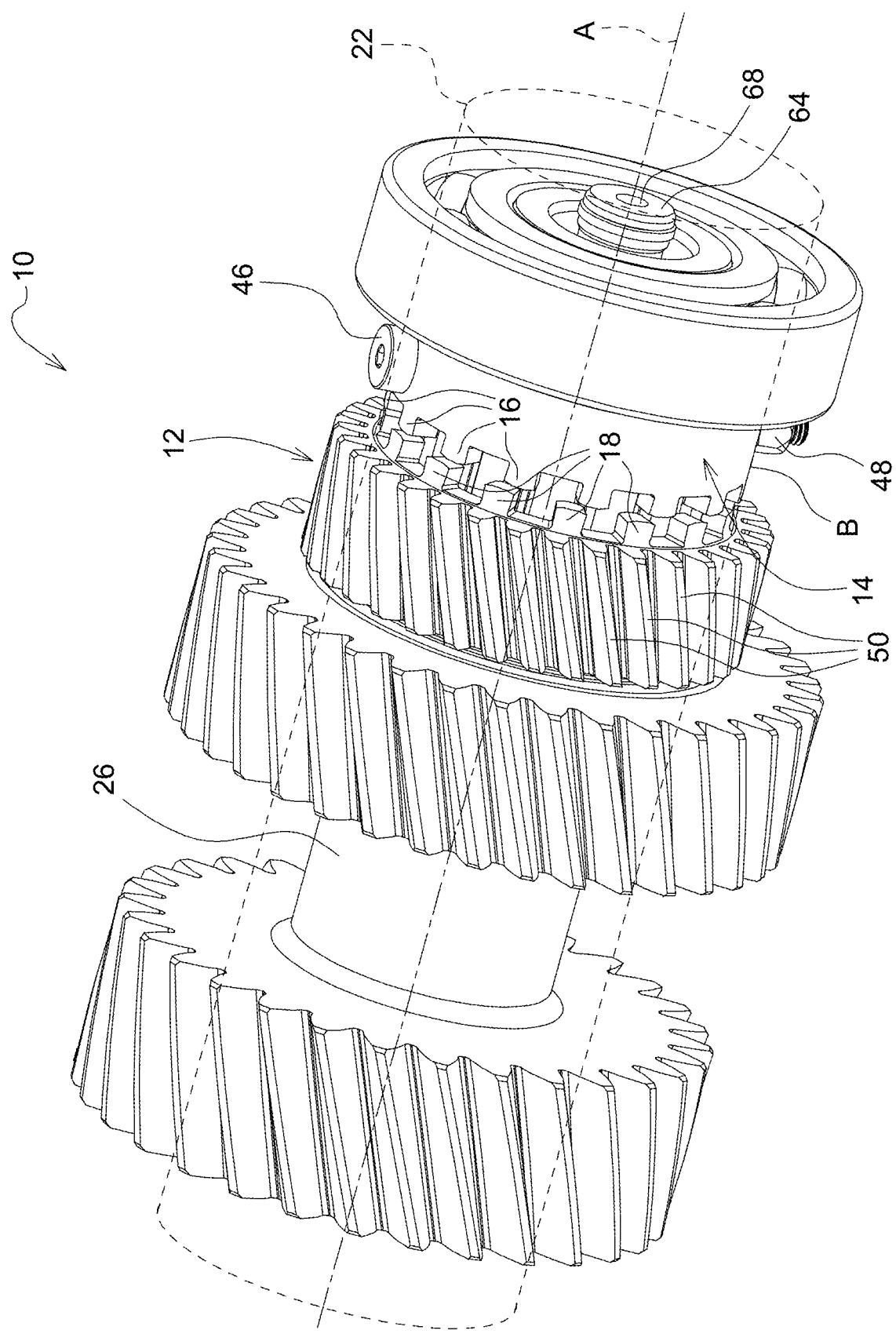
FIG. 2 is a perspective view of the axial shifter assembly of FIG. 1.

Referring to FIGS. 1-4, an axial shifter assembly 10 for a transmission is shown. The axial shifter assembly 10 includes a gear 12 and a shifting collar 14 arranged co-axially with respect to each other around a central axis A. The shifting collar 14 may include at least one axial tooth 16 projecting axially therefrom. The gear 12 may include at least one corresponding axial tooth 18 for meshing with the at least one axial tooth 16 of the shifting collar 14 in a driving engagement. Thus, the gear 12 meshes axially with the shifting collar 14. In other implementations, other types of meshing arrangements may be employed. The gear 12 further includes radial teeth 50. The radial teeth 50 may be for meshing with another gear in the transmission (see FIG. 8 as one example).

Figure 3:
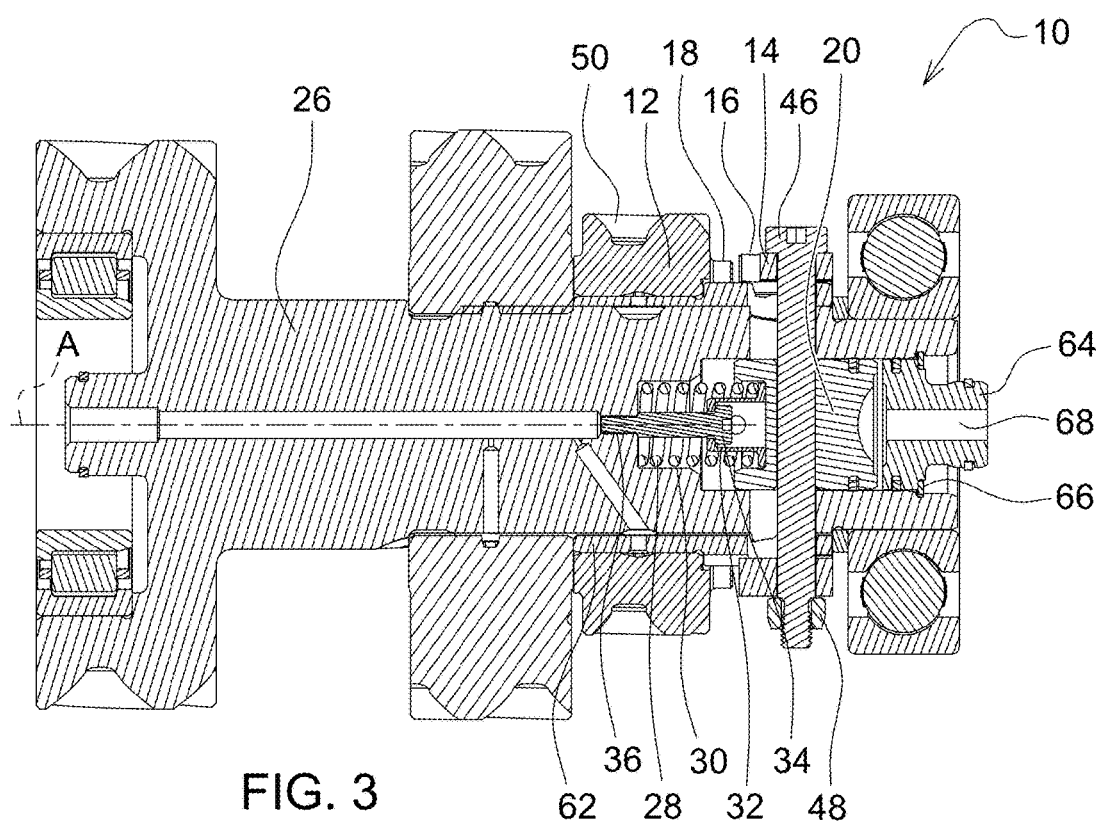
FIG. 3 is a side cross-sectional view of the axial shifter assembly of FIG. 1 in which a shifting collar is in a disengaged position.

The shifting collar 14 may be movable axially between an engaged position (FIG. 4) and a disengaged position (FIG. 3). In the engaged position, the shifting collar 14 drivingly engages with the gear 12 to drive the gear 12. In the disengaged position, the shifting collar shifting collar 14 is disengaged from the gear 12 to not drive the gear 12. A piston 20 is at least partially disposed radially inwards of the shifting collar 14. As such, at least part of the piston 20 is disposed within a cylindrical envelope 22 (FIG. 2) of the shifting collar 14. A radially-outermost point B of the shifting collar 14 cylindrical outer surface may define the cylindrical envelope 22 around and along the central axis A. In some examples, such as the illustrated example, the piston 20 may be disposed on the central axis A, e.g., such that the central axis A intersects the piston 20. The piston 20 may be centered on the central axis A. The piston 20 may be at least partially disposed in a central shaft 26. The piston 20 may be completely disposed in the central shaft 26.

The shifting collar 14 moves with the piston 20. The piston 20 and the shifting collar 14 may be movable axially, as a unit, towards and away from the gear 12. The piston 20 and the shifting collar 14 may be coupled for movement in any suitable way. As one example, a fastener 46 may couple the shifting collar 14 to the piston 20 for movement as a unit. The fastener 46 may be a bolt (and a nut 48 as illustrated), a pin, a screw, a clamp, or any other suitable type of fastener.

Figure 4:
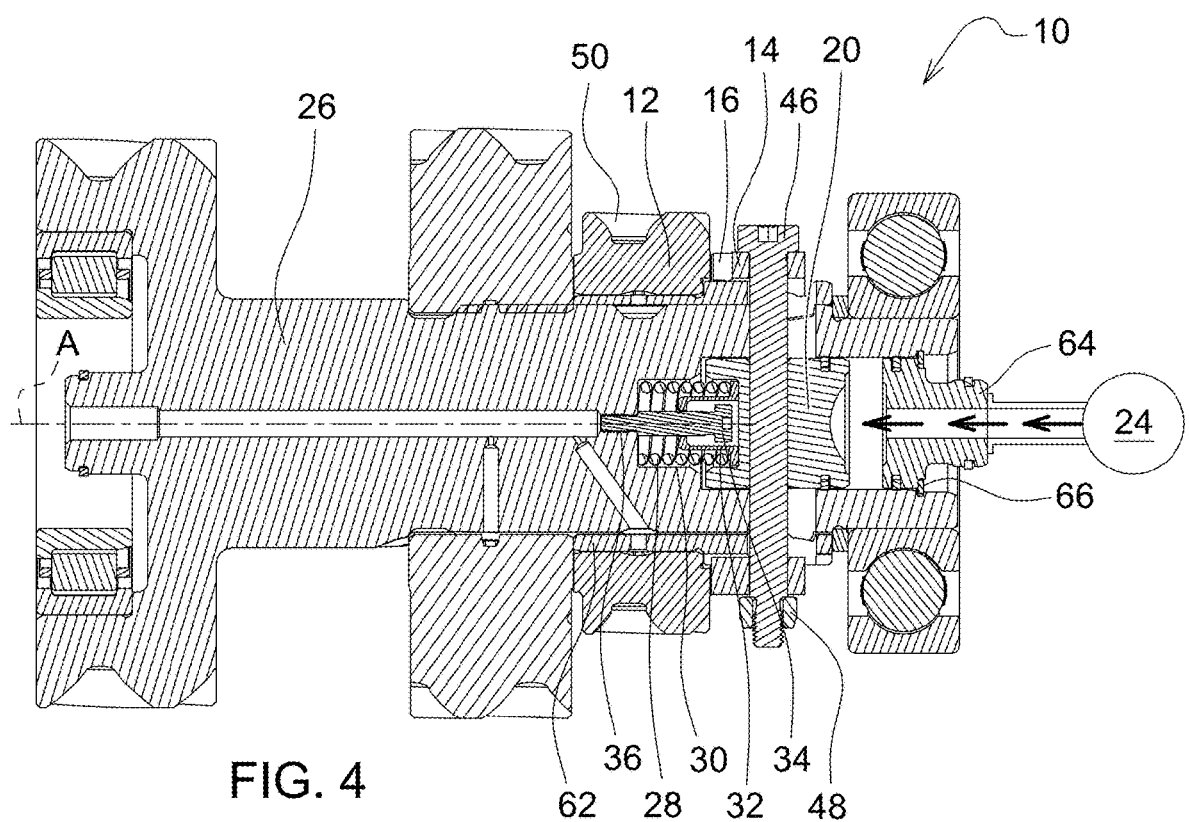
FIG. 4 is a side cross-sectional view of the axial shifter assembly of FIG. 1 in which the shifting collar is in an engaged position.

The piston 20 is actuatable between a first axial position (FIG. 3) corresponding to the disengaged position and a second axial position corresponding to the engaged position (FIG. 4). The piston 20 is actuatable by any suitable actuator 24. For example, the piston 20 may be actuatable by any of, or any combination of: a pressurized fluid, an electrically-controlled actuator, or manual actuation. Any type of pressurized fluid may be employed. For example, the pressurized fluid may include a hydraulic fluid, a pneumatic fluid, etc. Other types of actuators are possible. Other combinations of actuators are possible. For example, the actuator 24 may be electronically controlled to control the flow of the pressurized fluid for moving the piston 20. The actuator 24 may provide an external force acting to move the piston 20 in any suitable way. In the illustrated example, the external force acts co-axially with the axial shifter assembly 10. The external force may act parallel to or on the central axis A.

As best illustrated in FIGS. 1 and 3-4, a piston retainer 64 and a snap ring 66 may retain the piston 20 with respect to the central shaft 26. The piston retainer 64 may have an aperture 68 therethrough allowing the external force for moving the piston 20 to communicate with the piston 20 through the piston retainer 64. For example, the pressurized fluid may flow through the piston retainer 64 via the aperture 68.

The axial shifter assembly 10 may include the central shaft 26 in driving engagement with the shifting collar 14 to drive the shifting collar 14 in rotation about the central axis A. The driving engagement may be a constant mesh driving engagement. The shifting collar 14 may be driven in rotation by the central shaft 26 in any axial position along the central shaft 26 from the engaged position (FIG. 4) to the disengaged position (FIG. 3). The gear 12 may be disposed on the central shaft 26 and configured to allow the central shaft 26 to rotate within the gear 12 when the shifting collar 14 is disengaged from the gear 12 (FIG. 3). The gear 12 may be driven for rotation by the shifting collar 14 when the shifting collar 14 is engaged with the gear 12 (FIG. 4). As one example, best illustrated in FIGS. 1 and 3, the gear 12 may be mounted to the central shaft 26 via a splined ring 62 such that the gear 12 can rotate with respect to the splined ring 62.

The axial shifter assembly 10 may include a biasing member 28 for biasing the shifting collar 14 towards the disengaged position (FIG. 3). The biasing member 28 may have any suitable biasing structure that exhibits a restoring force when deformed, such as a spring, an elastic material, etc. The restoring force of the biasing member 28 acts to urge the piston 20 from the second axial position (FIG. 4) towards the first axial position (FIG. 3). In other implementations, the biasing member 28 may act to urge the piston 20 towards any position, such as the second axial position. The biasing member 28 may be at least partially disposed radially inwards of the shifting collar 14. As one example, the biasing member 28 may be disposed in a cavity 30 inside the central shaft 26. The biasing member 28 may be fully disposed inside the central shaft 26. The piston 20 may be at least partially disposed in the cavity 30 of the central shaft 26. The piston 20 may be fully disposed inside the central shaft 26. The piston 20 may be slidably disposed, at least partially or fully, in the cavity 30 of the central shaft 26.

The axial shifter assembly 10 may include a retainer 32 for retaining the biasing member 28 within the central shaft 26. The retainer 32 may be removably fastened with respect to the central shaft 26. One end of the biasing member 28 may bear against the central shaft 26 and another end of the biasing member 28 may bear against the retainer 32. Such bearing may be direct or indirect. The restoring force of the biasing member may act against the central shaft 26 on one end and the retainer 32 on the other end. A fastener 34 (which may also be referred to herein as a retainer fastener 34) may be employed to retain the retainer 32. The fastener 34 may be separate from or formed as a solid body with the retainer 32. In the illustrated example of FIG. 5, the fastener 34 is separate from the retainer 32. The fastener 34 may define a threaded shaft 36. The retainer 32 may be removably fastened with respect to the central shaft 26 via the threaded shaft 36. The threaded shaft 36 may be separate from or formed as a solid body with the retainer 32. The threaded shaft 36 may be threaded into the central shaft 26, directly or indirectly. The threaded shaft 36 may be unthreadable with respect to the central shaft 26 for disassembling the biasing member 28 in a controlled fashion while slowly relieving the restoring force of the biasing member 28. Because the retainer 32 retains the biasing member 28 rather than the piston 20, removal of the piston 20 during disassembly does not result in the sudden release of the restoring force of the biasing member 28. The restoring force of the biasing member 28 can be slowly released by unthreading the threaded shaft 36. By the time the threaded shaft 36 completely disengages from the central shaft 26, the restoring force of the biasing member 28 is relatively low or zero. Thus, the disclosure provides improved disassembly and serviceability.

Figure 5:
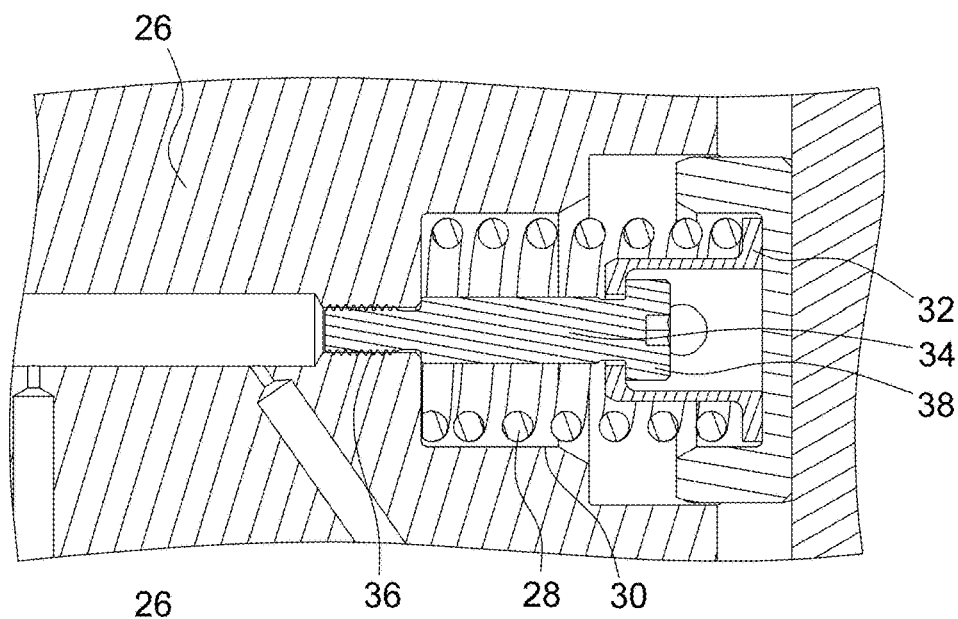
FIG. 5 is an enlarged view of a portion of the axial shifter assembly of FIG. 3.
Figure 6:
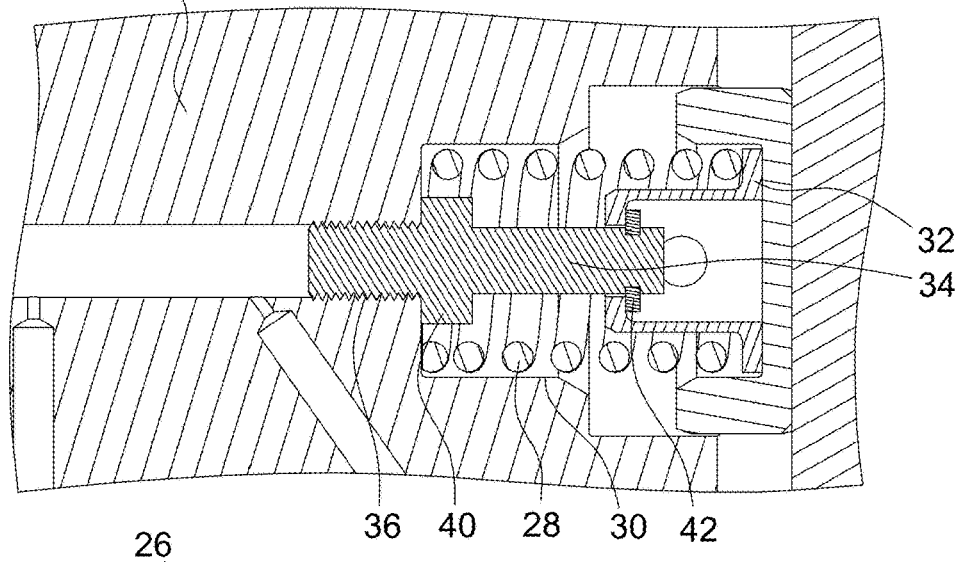
FIG. 6 is a first alternative to the portion of the axial shifter assembly shown in FIG. 5.
Figure 7:
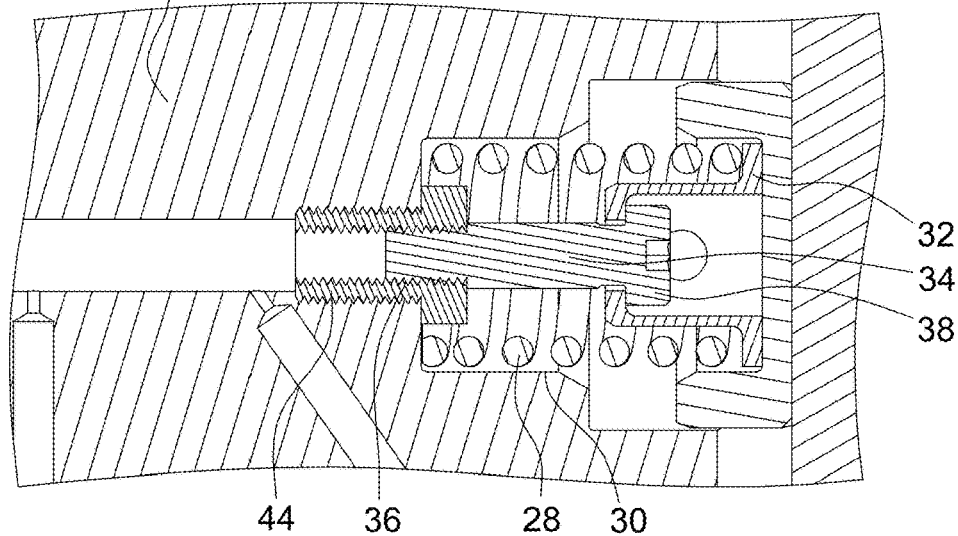
FIG. 7 is a second alternative to the portion of the axial shifter assembly shown in FIG. 5.

Referring to FIG. 5, the fastener 34 may be a bolt having the threaded shaft 36 and a bolt head 38 retaining the retainer 32. Referring to FIG. 6, the fastener 34 may be a stud having the threaded shaft 36 and a mechanical step 40 engaging the central shaft 26. As illustrated in FIG. 6, the fastener 34 may have a snap ring 42 for retaining the retainer 32. The fastener 34 may employ any other type of flange for retaining the retainer 32. Referring to FIG. 7, an externally and internally threaded cylinder with flange 44 may be threaded into the central shaft 26 and the fastener 34 may be threaded into the externally and internally threaded cylinder with flange 44. Thus, the fastener 34 may be directly or indirectly threaded into the central shaft 26.

The axial shifter assembly 10 may be used to selectively drive, or not drive, the gear 12 for any suitable application. As one example, the axial shifter assembly 10 may shift between different speeds. By placing the shifting provision (e.g., the piston 20) radially inwards of the shifting collar 14, or inside the central shaft 26, the axial shifter assembly 10 is made compact, lightweight, and cost effective.

Figure 8:
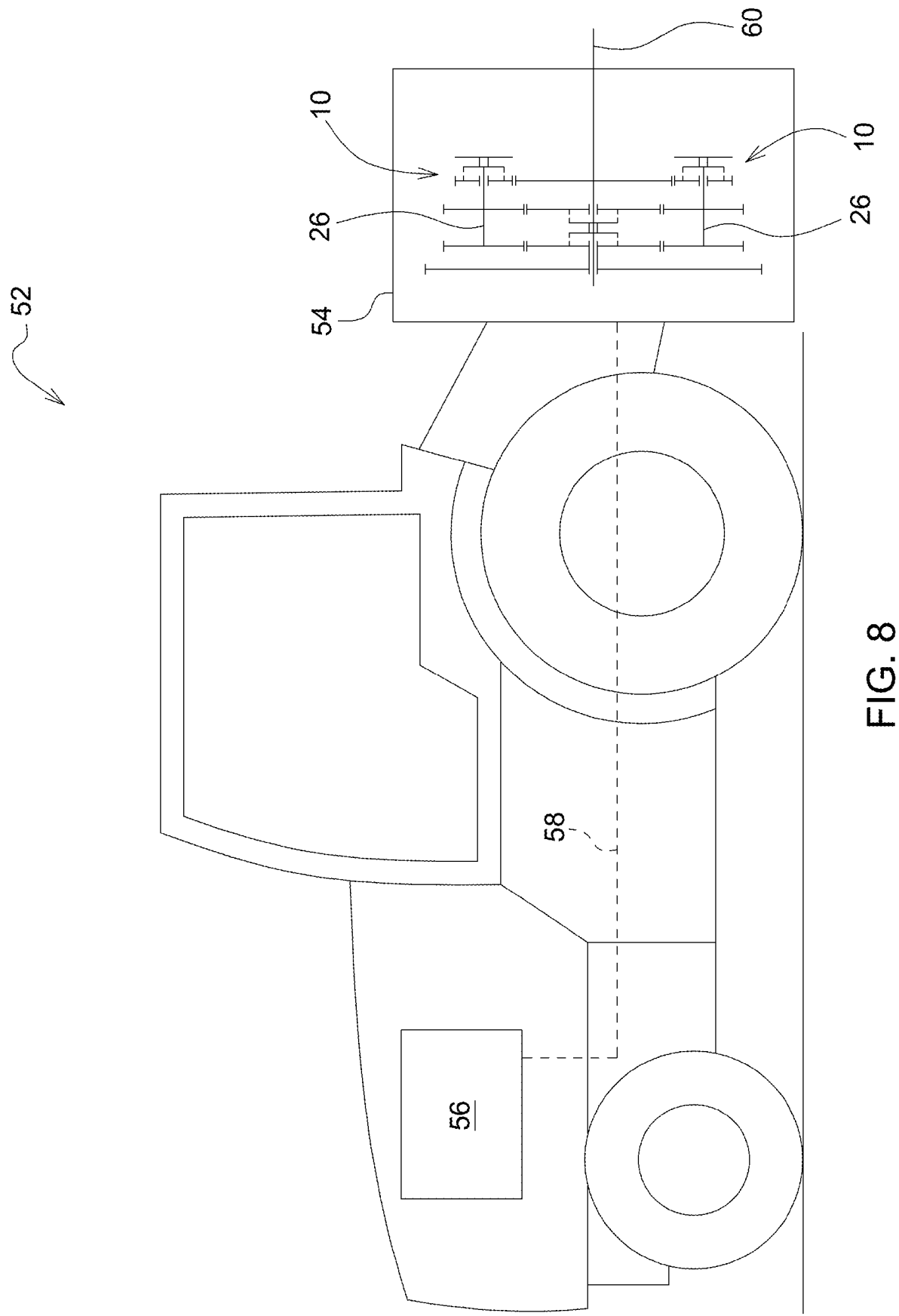
FIG. 8 is a schematic illustration of a work vehicle including a gearbox having the axial shifter assembly of FIG. 1.

FIG. 8 illustrates one example of an application for the axial shifter assembly 10. A vehicle 52 including a gearbox 54 having the axial shifter assembly 10 is illustrated. The vehicle 52 may be any suitable type of vehicle having a prime mover 56 and a transmission 58. The gearbox 54 may be part of the transmission 58. As one example, the vehicle 52 may be a work vehicle capable of powering attachable and removable implements. The work vehicle may be a tractor.

As illustrated in FIG. 8, the gearbox 54 may include a power take-off (PTO) shaft 60. The gearbox 54 may include the central shaft 26 arranged as a counter shaft in parallel with the PTO shaft 60. (As such, the term "counter shaft" may be used interchangeably with the term "central shaft 26.") The gearbox 54 may include one axial shifter assembly 10 in parallel with the PTO shaft 60, two axial shifter assemblies 10 (as illustrated) in parallel with the PTO shaft 60, or more. Each axial shifter assembly 10 may be operable to selectively drive, or not drive, the gear 12, which in turn, e.g., via the radial teeth 50 or any other suitable provision, may selectively drive, or not drive, the PTO shaft 60. For example, the axial shifter assembly 10 (or the plurality of axial shifter assemblies 10) may be used to select between different PTO speeds.

In operation, the axial shifter assembly 10 is used by axially moving the shifting collar 14 along the central shaft 26 into and out of driving engagement with the gear 12 via the piston 20 at least partially disposed in the central shaft 26. Movement of the piston 20 may be controlled electronically or manually. The external force for moving the piston 20 maybe provided hydraulically, pneumatically, by linear actuator, other mechanical actuator, manually, etc. The piston 20 may be actuated using the pressurized fluid in some examples. The piston 20 may be biased using the biasing member 28. The biasing member 28 may be retained using the retainer 32 removably connected with the central shaft 26. The retainer 32 may be removably connected to the central shaft 26 via the threaded shaft 36. The threaded shaft 36 may be separate from or formed as a solid body with the retainer 32. An operator may unthread the threaded shaft 36 from the central shaft 26 to lower the restoring force of the biasing member 28 while disassembling the biasing member 28. The driving engagement between the shifting collar 14 and the gear 12 is provided by at least one axial tooth 16. Other ways of using the axial shifter assembly 10 are apparent from the detailed description herein.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list in any quantity, or any combination thereof.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. An axial shifter assembly for a transmission, comprising:
   a gear and a shifting collar arranged co-axially with each other, the shifting collar having at least one axial tooth projecting axially therefrom, the shifting collar being movable axially between an engaged position in which the at least one axial tooth drivingly engages with the gear and a disengaged position in which the at least one axial tooth is disengaged from the gear; and
   a piston disposed at least partially radially inwards of the shifting collar, wherein the shifting collar moves with the piston, the piston being actuatable between a first axial position corresponding to the disengaged position and a second axial position corresponding to the engaged position.

2. The axial shifter assembly of claim 1, further comprising a central shaft in driving engagement with the shifting collar to drive the shifting collar in rotation about a central axis of the shifting collar.

3. The axial shifter assembly of claim 2, further comprising a biasing member disposed in a cavity inside the central shaft to bias the shifting collar towards the disengaged position.

4. The axial shifter assembly of claim 3, further comprising a retainer for retaining the biasing member within the central shaft, and a fastener retaining the retainer, wherein the fastener is separate from or formed as a solid body with the retainer, wherein the fastener is threaded into the central shaft and unthreadable from the central shaft for disassembling the biasing member.

5. The axial shifter assembly of claim 2, wherein the piston is slidably disposed in a cavity inside the central shaft.

6. The axial shifter assembly of claim 1, wherein the piston is actuatable by any of, or any combination of: a pressurized fluid, an electrically-controlled actuator, or manual actuation.

7. The axial shifter assembly of claim 1, wherein the gear and the shifting collar are co-axial about a central axis, wherein the piston is disposed on the central axis.

8. The axial shifter assembly of claim 1, wherein the piston is actuatable by a pressurized fluid.

9. The axial shifter assembly of claim 1, further comprising a fastener coupling the shifting collar to the piston.

10. The axial shifter assembly of claim 1, wherein the gear meshes axially with the shifting collar, and the gear further includes radial teeth.

11. A vehicle including a gearbox having the axial shifter assembly of claim 1.

12. The vehicle of claim 11, wherein the gearbox further comprises a PTO shaft and a counter shaft in parallel with the PTO shaft, wherein the counter shaft drives the shifting collar, and wherein the piston is slidably received in a cavity within the counter shaft.

13. An axial shifter assembly, comprising:
    a central shaft;
    a shifting collar movable axially with respect to the central shaft into and out of driving engagement with a co-axial gear;
    a piston at least partially disposed radially inwards of the shifting collar, wherein the shifting collar moves axially with the piston, the piston being actuatable between a first axial position and a second axial position;
    a biasing member at least partially disposed radially inwards of the shifting collar and biasing the piston to one of the first axial position or the second axial position; and
    a retainer for retaining the biasing member with respect to the central shaft, wherein the retainer is removably fastened with respect to the central shaft.

14. The axial shifter assembly of claim 13, wherein the retainer is removably fastened with respect to the central shaft via a threaded shaft, the threaded shaft being separate from or formed as a solid body with the retainer, wherein the threaded shaft is unthreadable with respect to the central shaft to lower a restoring force of the biasing member while disassembling the biasing member.

15. The axial shifter assembly of claim 13, wherein the piston is actuatable by a pressurized fluid.

16. The axial shifter assembly of claim 13, wherein the shifting collar has at least one axial tooth projecting axially therefrom for axially meshing into driving engagement with the co-axial gear.

17. A method for using an axial shifter assembly having a shifting collar and a co-axial gear arranged about a central shaft, comprising:

axially moving the shifting collar into and out of driving engagement with the co-axial gear via a piston at least partially disposed radially inwards of the shifting collar;

biasing the piston using a biasing member; and retaining the biasing member using a retainer removably connected with respect to the central shaft.

18. The method of claim 17, further comprising:

removably connecting the retainer with respect to the central shaft via a threaded shaft, the threaded shaft being separate from or formed as a solid body with the retainer; and unthreading the threaded shaft with respect to the central shaft to lower a restoring force of the biasing member while disassembling the biasing member.

19. The method of claim 17, wherein the driving engagement between the shifting collar and the co-axial gear is provided by at least one axial tooth.

20. The method of claim 17, further comprising actuating the piston using a pressurized fluid.

* * * * *